US005430455A

United States Patent [19]

Heddebaut et al.

[11] Patent Number: 5,430,455

[45] Date of Patent: Jul. 4, 1995

[54] MICROWAVE LOCATION SYSTEM

[75] Inventors: Marc Heddebaut, Sainghin En Melantois; Marion Berbineau, Lambersart; Stéphane Lassalle, Gennevilliers; Pierre Degauque, Lambersart, all of France

[73] Assignee: GFC Alsthom S A, Paris, France

[21] Appl. No.: 936,348

[22] Filed: Aug. 28, 1992

[30] Foreign Application Priority Data

Aug. 30, 1991 [FR] France ................................ 91 10787

[51] Int. Cl.[6] .......................... G01S 3/02; G01S 1/08; H01Q 13/10

[52] U.S. Cl. .................................... 342/457; 342/454; 342/386; 343/770; 343/771

[58] Field of Search .................... 342/454, 457, 44, 51, 342/386, 385; 343/770, 771; 340/933; 246/7, 8, 122 R

[56] References Cited

U.S. PATENT DOCUMENTS

| | | | |
|---|---|---|---|
| 3,281,591 | 10/1966 | Takeya | 343/771 |
| 3,629,707 | 12/1971 | Baba et al. | 343/770 |
| 3,648,172 | 3/1972 | Nakahara et al. | 343/771 |
| 4,823,138 | 4/1989 | Shibano et al. | 342/457 |
| 4,873,531 | 10/1989 | Heddebaut et al. | 343/771 |
| 4,932,617 | 6/1990 | Heddebaut et al. | 343/770 |

FOREIGN PATENT DOCUMENTS

| | | |
|---|---|---|
| 2608119 | 6/1988 | France . |
| 1573604 | 8/1980 | United Kingdom . |

*Primary Examiner*—Gregory C. Issing

*Attorney, Agent, or Firm*—Sughrue, Mion, Zinn, Macpeak & Seas

[57] ABSTRACT

A microwave system for locating a mobile element comprises a hollow tube forming a waveguide fed with microwave signals. A location beacon radiates into free space an electromagnetic wave derived from the microwave signals propagating in the waveguide. A location antenna attached to the mobile element receives the electromagnetic wave radiated by the beacon. The location beacon transmits to the antenna a single electric field signal enabling transmission of a location message.

12 Claims, 5 Drawing Sheets

MICROWAVE LOCATION SYSTEM

BACKGROUND OF THE INVENTION

1. Field of the Invention

The present invention concerns a microwave location system.

2. Description of the Prior Art

French patent No 2 608 119 discloses a railroad vehicle location system comprising a hollow tube parallel to the track forming a waveguide of which an emissive surface comprises an array of apertures through which microwave radiation passes, a unit for feeding microwave radiation into said hollow tube and a microwave receive antenna on board the railroad vehicle located near the side of the tube comprising the array of apertures which is adapted to enable the transmission between said apertures and said antenna of two distinct electric field signals.

To be more precise, to enable absolute location of the vehicle some apertures in the emissive surface of the hollow tube are perpendicular to the axis of the tube and some others are oblique to this axis, arranged in a particular pattern representing an appropriate code, the apertures perpendicular to the axis transmitting an axial component and the apertures oblique to the axis further transmitting a perpendicular component.

This document teaches also a method of transmitting data between a railroad vehicle and a traffic control station and simultaneously determining the relative location of the vehicle which entails choosing for the waveguide microwave feed unit an emitter of two different microwave frequencies, one dedicated to data transmission and producing a constant amplitude of the electric field signal received by a receive antenna on board the vehicle and the other dedicated to location and producing significant amplitude fluctuation in the electric field signal received by a location antenna also on board the vehicle to enable the speed of the vehicle to be measured by counting the number of apertures and therefore its relative location to be determined.

An object of the present invention is to provide a microwave location system which, in one configuration at least, requires only one electric field signal to be radiated to determine the absolute location of a mobile element, although this does not rule out the system being used also to determine the relative location of said mobile element or extending said configuration to transmit also an electric field signal, for example to have the system implement additional functions separate from the location function itself such as transmission of data to or from said mobile element, measuring the speed of said mobile element, etc, or, in the case where said radiation is produced by means of a certain number of radiating slots in the waveguide, providing certain embodiments of this location system.

SUMMARY OF THE INVENTION

The present invention consists in a microwave system for locating a mobile element comprising a hollow tube forming a waveguide, means for feeding said waveguide with microwave signals, a location beacon radiating into free space an electromagnetic wave derived from the microwave signals propagating in the waveguide and a location antenna attached to said mobile element and adapted to receive the electromagnetic wave radiated by said beacon, in which system said location beacon is adapted to transmit to said antenna a single electric field signal enabling transmission of a location message.

In a first embodiment of the invention said beacon comprises means for sampling microwave energy at a particular frequency from the waveguide which constitutes a location message carrier frequency, means for radiating the sampled energy into free space and on the downstream side of said location antenna means for detecting said location message.

In a second embodiment of the invention said location message is embodied in said beacon which comprises to this end a number of radiating slots in said waveguide arranged to form a symbol or a succession of symbols recognisable individually by analyzing the evolution of at least one parameter of said electric field signal received by said location antenna as said mobile element passes over said beacon.

Other objects and features of the present invention will emerge from the following description of embodiments of the invention given with reference to the appended drawings.

DETAILED DESCRIPTION 0F THE INVENTION

Figure 1:
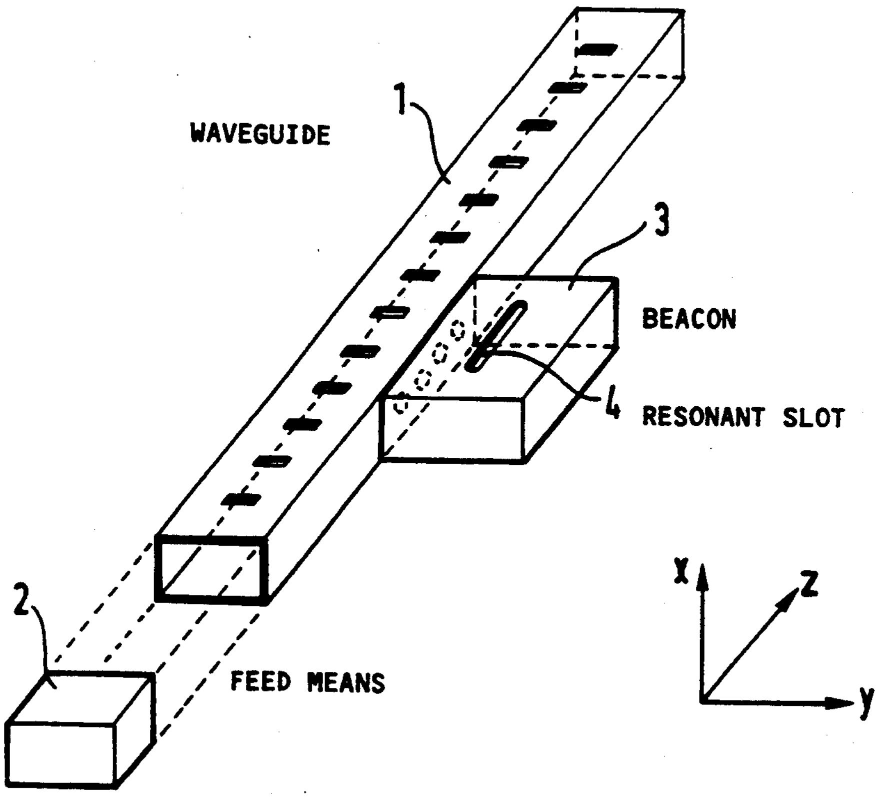
FIG. 1 shows a location system in accordance with said first embodiment of the invention.
Figure 1:
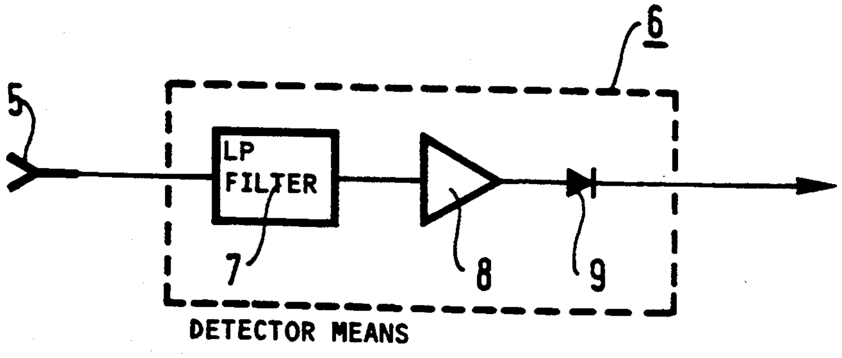

The location system shown in FIG. 1 and constituting the first embodiment of the invention comprises:

- a hollow tube 1 forming a microwave waveguide, of which only a section is shown,
- feed means 2 for coupling microwave radiation into said waveguide, situated at one end thereof,
- at least one location beacon 3 comprising means (not shown) such as a directional coupler for sampling some of the microwave radiation propagating within the guide and means such as a resonant slot 41for radiating into free space the sampled radiation, possibly after filtering (not shown) a defined location message carrier frequency from a set of frequencies transmitted simultaneously in the guide or a defined specific location message carrier frequency addressed to the beacon in question from a set of location message carrier frequencies addressed to different beacons, and
- a location antenna 5 on board the mobile element (not shown) adapted to receive the microwave radiation and means 6 for detecting the location message carried by the microwave radiation received by the antenna 5.

The detector means may conventionally comprise a low-pass filter 7 driving an amplifier 8 driving a detector diode 9.

In the solution just described, the location beacon is entirely implemented by passive microwave means.

One variant of this first embodiment would be to use, instead of certain microwave means, electronic means such as a mixer diode to generate a UHF wave from said defined frequency (possibly after filtering as described above) and another frequency transmitted simultaneously in the guide, such as a frequency for transmitting data to the mobile element or for measuring the speed of the mobile element, by means of the transmission medium provided by the waveguide, in which case one side of the waveguide would comprise an array of radiating apertures disposed regularly along that side. The UHF signal obtained in this way would then be radiated by a miniature antenna.

This first embodiment therefore has the specific feature of transmitting at a high bit rate (several kbit/s) a complete location message which can therefore be read even if the mobile element is stationary over the beacon.

Note that the provision of different location message carrier frequencies enables absolute location whereas providing only one such frequency enables only relative location.

There will now be described a second embodiment based on a different principle which requires movement of the mobile element over the beacon to recover the location message. In this embodiment the location message is embodied in the guide itself, in this instance in the form of radiating slots as will be described later, following a brief outline of the spatial evolution of the radiated field above the waveguide, based on an approximate method of calculating the electromagnetic field radiated by an aperture. This method is based on the following hypotheses:

- the short-circuit magnetic field is uniform over the surface of the aperture (equal phase and equal amplitude),
- the transverse dimensions of the apertures in the guide are small relative to the wavelength, and
- the observation point is at a distance which is large relative to the aperture dimensions.

It can then be shown that if an aperture is illuminated by an electromagnetic wave the field diffracted through the aperture is equivalent to those emitted by an electric dipole and two point magnetic dipoles.

The apertures, rectangular in this instance, are treated as elliptical apertures having the same extreme dimensions in order to simplify the calculations of the dipole component.

The rectangular apertures are much longer than they are wide so as to limit the energy radiated in the direction of the axis of the slot and to neglect the moment of the equivalent electric dipole and that of one of the two magnetic dipoles.

Figure 2:
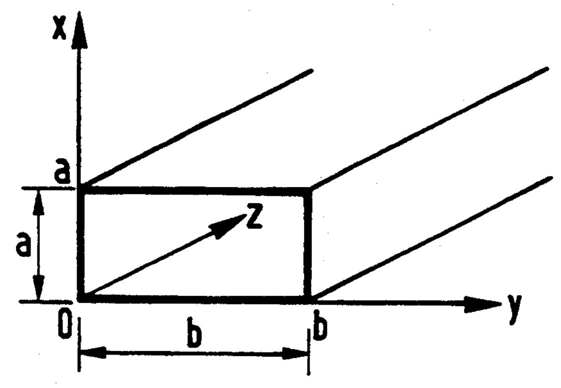
FIGS. 2, 3, 4, 5, 6 and 7 show the theory of operation of a radiating slot in a waveguide.

The direct orthogonal frame of reference (O, x, y, z) and the systems of axes associated with the guide and with a slot are shown in FIG. 2.

Figure 3:
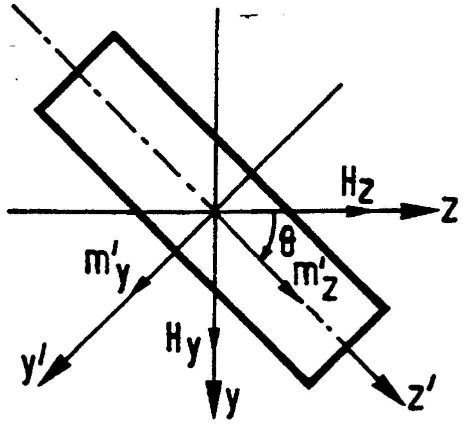

In the case of very narrow rectangular apertures inclined at 0 relative to the axis Oz, as shown in FIG. 3, the moment of the electric dipole is regarded as negligible. The components $m_z$ and $m_y$ of the moment of the magnetic dipole equivalent to the aperture are therefore given by:

$$m_z=(\alpha_{mz'}\cos^2\theta+\alpha_{my'}\sin^2\theta)\,H_z+(\alpha_{mz'}-\alpha_{my'})\sin\theta\cos\theta H_y$$

$$m_y=(\alpha_{mz'}-\alpha_{my'})\sin\theta\cos\theta H_z+(\alpha_{mz'}\sin^2\theta+\alpha_{my'}\cos^2\theta)H_y$$

in which the terms $\alpha_{my'}$ and $\alpha_{mz'}$ denote magnetic polarizabilities.

If it is assumed that only the fundamental mode $TE_{01}$ exists along the structure and propagates along the positive z axis and considering radiation from the interior of the guide to the exterior, the components $H_y$ and $H_z$ of the magnetic field are given by the following expressions:

$$H_y = H_o j\frac{kg}{kc^2}\;\frac{\pi}{b}\sin\frac{\pi y}{b}\,e^{-jkgz}$$

$$\text{where } kc=\frac{\pi}{b} \text{ and } \lambda c = 2b$$

$$H_z = H_o\cos\frac{\pi y}{b}\,e^{-jkgz}$$

$$\text{where } k_g^2 = 4\pi^2\left(\frac{1}{\lambda^2}-\frac{1}{\lambda_c^2}\right)=k^2-k_c^2$$

where $H_o$ denotes an amplitude constant and j denotes the complex number such that $j^2=-1$.

Figure 4:
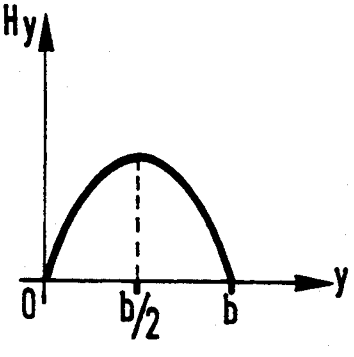
Figure 5:
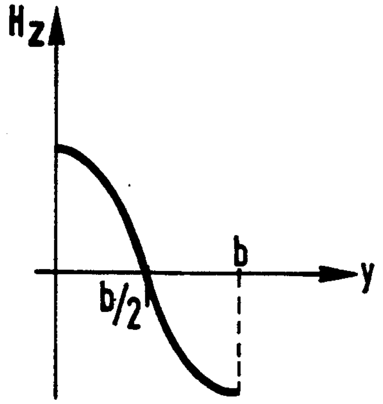
Figure 6:
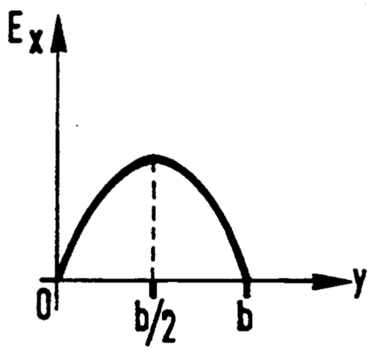

The terms $\alpha_{my'}$ and $\alpha_{mz'}$ can be varied by varying the ratio of the length to the width of the slot in question. The amplitude of the magnetic field component $H_z$ and $H_y$ illuminating it can be varied by varying the transverse position of the aperture. It is therefore possible to modify the energy radiated by a transverse slot according to its position on the guide and its dimensions. FIGS. 4, 5 and 6 respectively show the evolution within the guide of the components of the magnetic field along the Oy and Oz axes and of the component of the electric field along the Ox axis relative to the transverse dimension of the guide.

In the case of a perpendicular slot, the angle between the aperture and the axis of the guide is $\pi/2$; the magnetic moments are therefore written: $m_z=\alpha_{my'}H_z$ and $m_y=\alpha_{mz'}H_y$.

The geometry of perpendicular slots means that $\alpha_{my'}$ may be assigned a value that is very small relative to that of $\alpha_{mz'}$. Moreover, if the slots are placed where the magnetic field $H_y$ is maximal, that is to say at $y=b/2$, the magnetic moment is reduced to its component along Oy only. Considering each slot as a dipole, the field $E_{zi}$ radiated by an aperture fi is therefore written:

$$E_{zi} = -m_y\frac{k^2}{4\pi}\,Zo\,\frac{(xM-xi)}{r_i}\left(\frac{1}{r_i}-\frac{j}{kr_i^2}\right)e^{-j\Psi_i}$$

where $$r_i=(id-z_o)^2+(y_o-y_i)^2+(x_o-x_i)^2$$

$$\Psi_i=kr_i+ikg\,d \text{ if } z_i>z_o$$

$$\Psi_i=kr_i-ikg\,d \text{ if } z_i<z_o$$

where (xM, yM, zM) denote the coordinates of the observation point M in the (x, y, z) frame of reference, (xi, yi, zi) the coordinates of the slot fi in the same frame of reference, "d" the inter-slot pitch, "i" the rank of slot fi relative to an arbitrary slot fo, (xo, yo, zo) the coordinates of the slot fo in the (x, y, z) frame of reference and $Zo=120\,\pi$.

Figure 7:
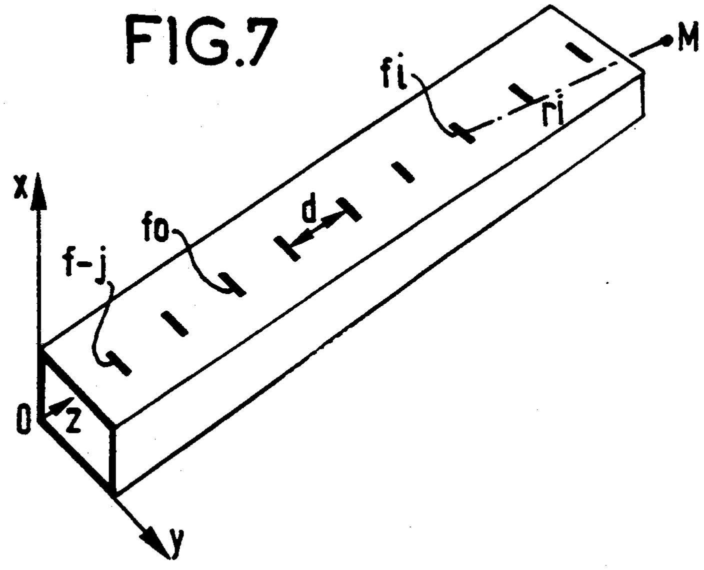

The total field radiated at a point by an array of perpendicular slots is equal to the sum of the radiated fields $E_{zi}$ at this point of each dipole as shown in FIG. 7.

In the case of axial slots the magnetic moments parallel to the guide axis are: $m_z=\alpha_{mz'}H_z$ and $m_y=\alpha_{my'}H_y$.

Their geometry is such that in this case $\alpha my'$ has a value that is very small compared with $\alpha_{mz'}$, so that the magnetic moment along Oz will be predominant this time, i.e. $m_z=\alpha_{mz'}H_z$. Given the spatial evolution of the component $H_{z'}$ it will be appropriate to form the slots at a point y=b/4 or y=3b/4 to maximize the amplitude of the radiated field.

The field $E_{yi}$ radiated by an axial slot treated as a dipole is expressed as follows:

$$E_{yi} = m_z \frac{k^2}{4\pi} Zo \frac{(xM - xi)}{r_i}\left(\frac{1}{r_i} - \frac{j}{kr_i^2}\right)e^{-jkr_i}$$

The various arrangements of slots or patterns described hereinafter in relation to FIGS. 8 through 17 exploit the evolution during passage of the location antenna of the mobile element over the beacon of one of the parameters of the electric field received by the location antenna which in a first embodiment (FIGS. 8 through 15) is the amplitude and in a second embodiment (FIGS. 16, 17) is the phase.

The patterns in FIGS. 8 through 11, 12 and 14, 13 and 15 enable three separate symbols to be coded by specific electromagnetic signatures.

Note that the patterns may be grouped to constitute sequences of symbols to expand the coding possibilities by means of a chosen "n" symbol code.

Note also that providing separate symbols or sequences having separate electromagnetic signatures (depending on the number of beacons to be distinguished) enables absolute location whereas providing the same symbol or sequence of symbols for all beacons enables only relative location.

Figure 8:
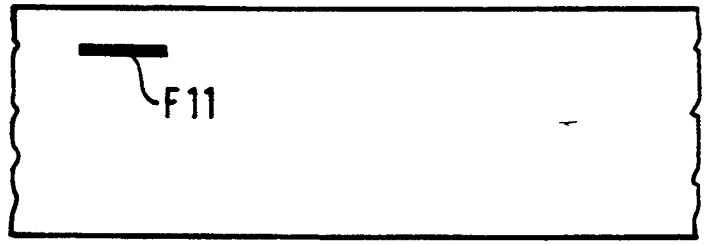
FIGS. 8 through 17 show for said second embodiment of the invention various possible arrangements of radiating slots for coding a symbol, these various arrangements being shown by way of example and in top views of the emissive surface of the waveguide.
Figure 9:
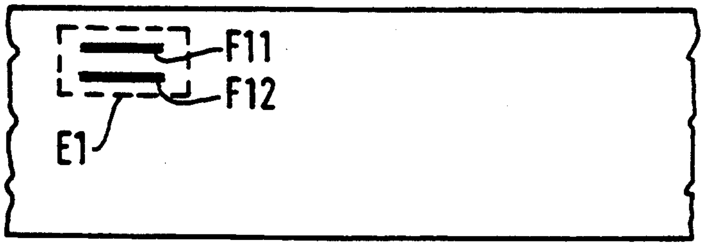
Figure 10:
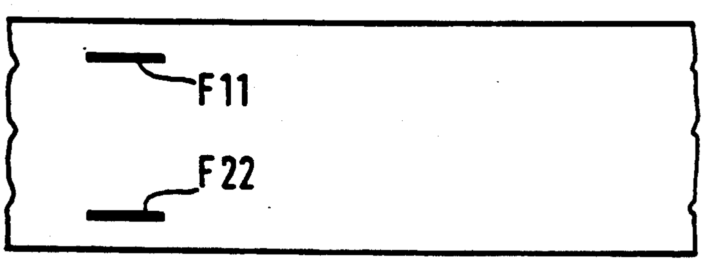
Figure 11:
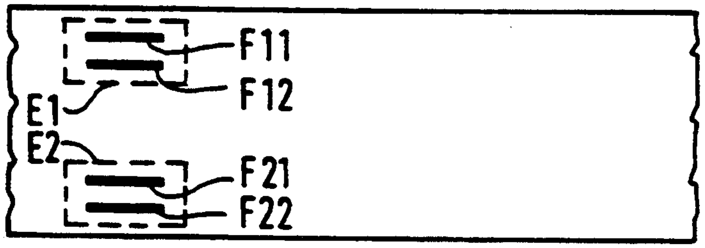

A symbol can be coded by the presence of a single axial slot $F_{11}$ (FIG. 8) or a set E1 of axial slots on the same side of the axis of the guide (FIG. 9, showing two slots $F_{11}$ and $F_{12}$ per set, for example) or two axial slots $F_{11}$ and $F_{22}$ arranged symmetrically to the axis of the guide (FIG. 10) or two sets E1 and E2 of axial slots symmetrical to the axis of the guide (FIG. 11 showing two slots respectively $F_{11}$, $F_{12}$ and $F_{21}$, $F_{22}$ per set, for example).

If the symbol complementary to that represented by the patterns described is to be coded by the absence of any pattern the location system must also comprise sampling means supplying to the mobile element a clock signal indicating the times to respond to the signal received by the location antenna to detect these symbols or these complementary symbols.

The sampling means may, for example, be in the form of an array of perpendicular slots fed with a particular frequency to obtain an electric field diagram showing significant amplitude fluctuations at the location of said perpendicular slots.

Given the evolution of the field $H_z$ inside the guide (FIG. 5), these axial slots will advantageously be provided at b/8 in the FIG. 8 case, at b/8 and b/4 in the FIG. 9 case, at b/8 and 7b/8 in the FIG. 10 case and at b/8, b/4, 3b/4 and 7b/8 in the FIG. 11 case.

It is nevertheless possible to increase the amplitude of the field radiated above the guide by using more eccentric axial slots; it is then necessary to allow for possible lateral movement of the mobile element and therefore of its location antenna relative to the guide axis, however, although the effect of such lateral movement is limited by providing a symmetrical arrangement of the slots relative to the axis of the guide (as shown in FIGS. 10 and 11) and by providing more than one slot on each side of the axis (as shown in FIGS. 9 and 11).

In the case described here relying on the evolution of the amplitude of the electric field received by the location antenna as the mobile element passes over the symbols, the antenna is advantageously in the form of one or more point antennas placed in a region where the amplitude of the electric field received is maximum when the mobile element passes over a symbol characterized by the presence of axial slots.

Figure 18:
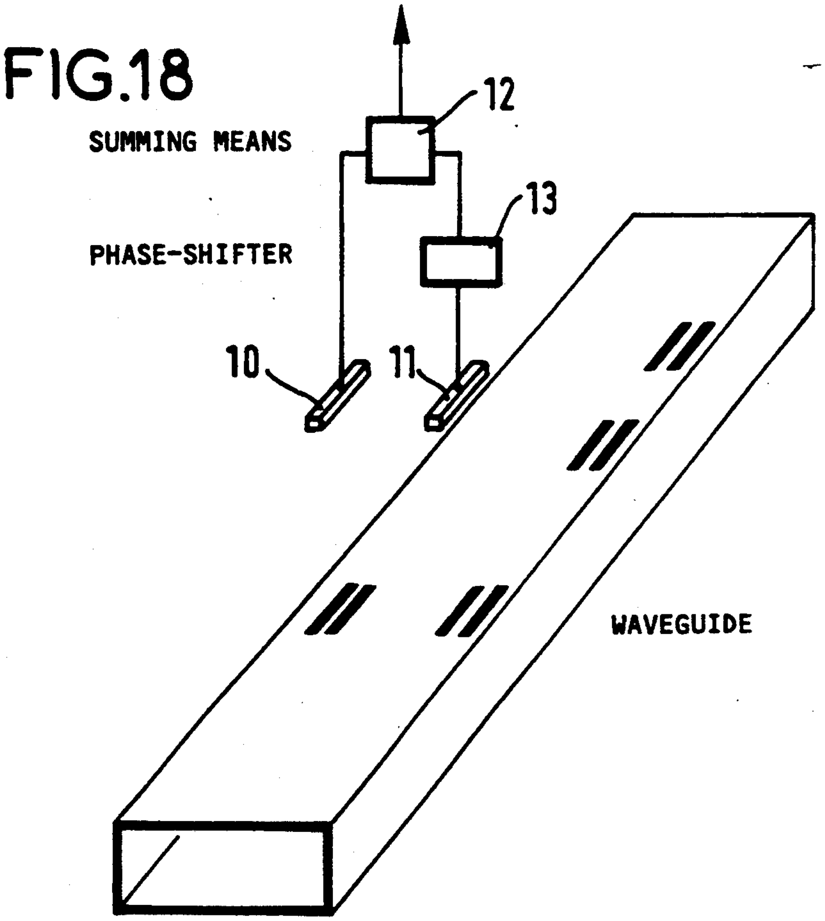
FIGS. 18 and 19 show possible embodiments of the location antenna in this second embodiment of the invention, incorporating an analysis of one of the parameters of the radiated electric field, this parameter being the amplitude in the case of FIG. 18 and the phase in the case of FIG. 19.

In the case of axial slots on each side of the axis of the guide, the opposite phase of $H_z$ on each side of the axis cancels out at the center of the guide and over a great distance the field radiated by the pair of two dipoles formed by these two slots fed in phase opposition. To alleviate the problems caused by the cancellation on the axis of the guide (y=b/2) of the field $E_y$ radiated by two axial slots symmetrical to this axis, a location antenna is considered, as shown in FIG. 18, as equivalent to two advantageously point antennas 10, 11 advantageously disposed symmetrically relative to the axis of the guide and spaced by a distance less than the width of the guide, the signals received at these two points being summed in a summing unit 12 after a phase-shift equal to $\pi$ is inserted into one of the channels by means of a phase-shifter 13. With an antenna of this kind the electric field radiated by the axial slot will be maximal when the axis of the receive point is above the axis of the guide.

Figure 12:
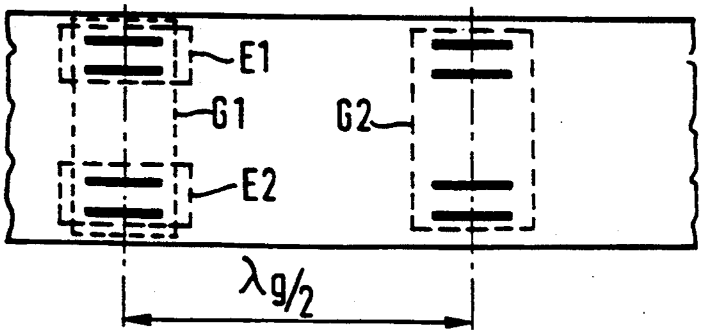
Figure 13:
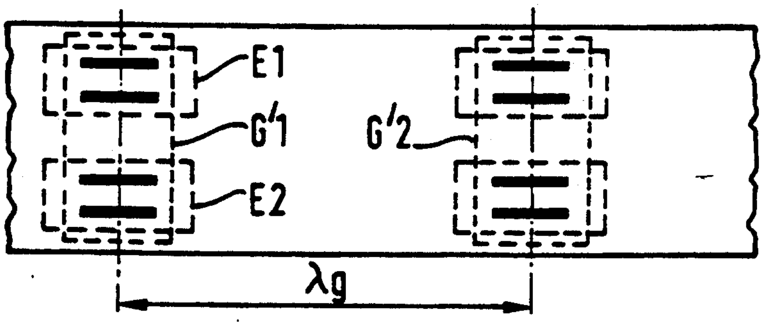
Figure 14:
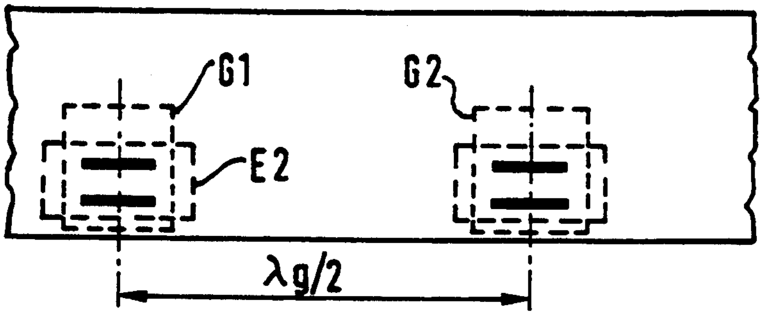
Figure 15:
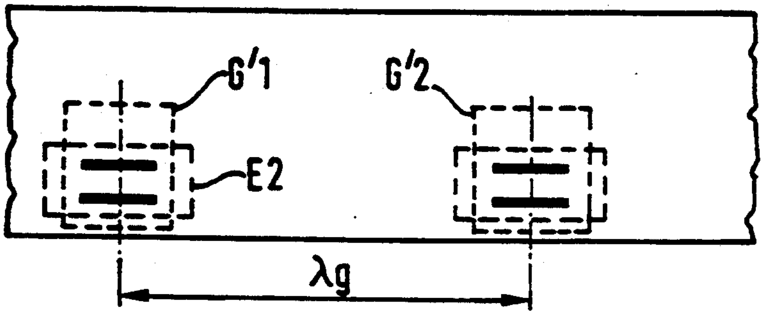

It is further possible to code not two separate symbols as just described, which may be called 0 and 1 to use binary notation, but four separate symbols 00, 01, 11 and 10, again using binary notation, by remarking that:

- a pattern such as that shown in FIGS. 8, 9, 10 and 11 gives a single maximum, enabling a first symbol to be coded,
- a pattern formed as shown in FIGS. 12 and 14 by two groups G1 and G2 spaced by $\lambda g/2$ (where $\lambda g$ denotes the guided wavelength) and each formed by a set $E_2$ of axial slots (FIG. 14) or of two sets $E_1$, $E_2$ of axial slots gives two maxima separated by a very accentuated minimum, enabling a second symbol to be coded,
- a pattern formed as shown in FIGS. 13 and 15 by two groups $G'_1$ and $G'_2$ spaced by $\pi g$ and each formed either by a set $E_2$ of axial slots (FIG. 15) or two sets $E_1$, $E_2$ of axial slots (FIG. 13) gives three consecutive maxima, enabling a third symbol to be coded.

The binary number 00 may therefore be assigned to the absence of any symbol, for example, and the binary numbers 10, 01 and 11 respectively to the first, second and third of the symbols mentioned above. The representation of one of these binary numbers by the absence of any symbol however requires the provision of sampling means such as those described above by way of example.

Another manner of coding two separate symbols other than by the presence or the absence of a pattern such as those shown in FIGS. 8 through 15 and which does not require any such sampling means is to take for one of these symbols one of the patterns described with reference to one of FIGS. 8, 9, 10, 13 and 15 and for the other of the symbols one of the patterns described with reference to FIGS. 12 and 14, FIG. 14 differing from FIG. 12 only by virtue of a mechanical simplification preventing any want of symmetry of the pattern either side of the axis of the guide degrading the quality of the minimum produced in such cases between two maxima and which makes a clear distinction between the electromagnetic signatures of the two symbols considered here.

Figure 16:
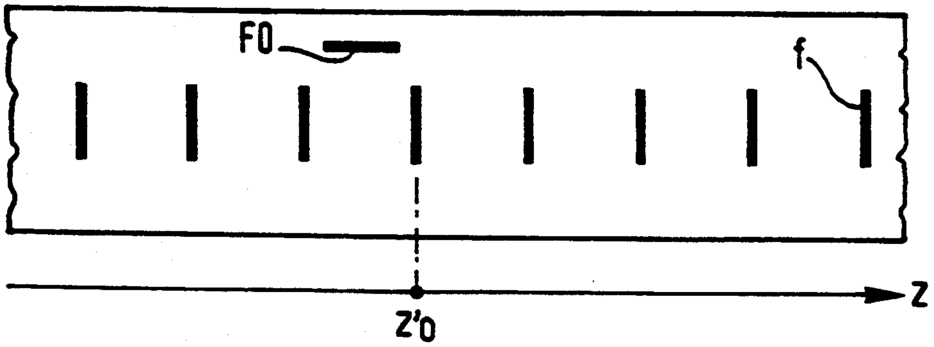
Figure 17:
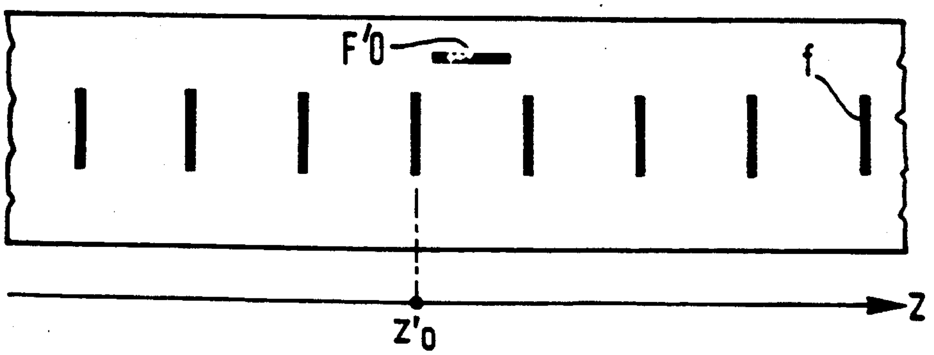

Another example of this second embodiment of the present invention will now be described with reference to FIGS. 16 and 17, based on an analysis of the phase of the electric field received by the location antenna when it passes over a beacon also comprising radiating slots in the waveguide.

In this variant a symbol is represented by the presence of an axial slot $F_o$ on the guide with a negative coordinate relative to a particular reference point $z'_o$ and the complementary symbol by an axial slot $f'_o$ on the guide at a positive coordinate relative to said reference point $z'_o$.

Figure 19:
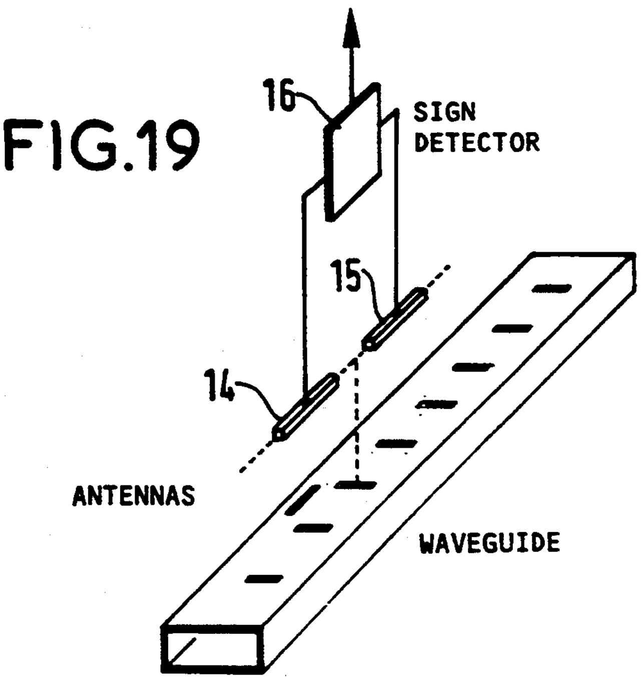

As shown in FIG. 19, the location antenna then comprises two antennas 14, 15 which are advantageously point antennas disposed vertically above the location of said axial slots when the center of symmetry of these point antennas passes vertically over said reference point $z'_o$. This time, called the sampling time, is determined by sampling means which may be as described above and shown in FIGS. 16 and 17, for example, formed by an array of perpendicular slots "f" fed with a particular frequency and producing an electric field diagram having significant amplitude fluctuations at the location of said perpendicular slots.

Thus according to the position of said axial slots at a negative or positive coordinate relative to said reference points, that is to say before or after said sampling times, a received electric field signal phase sign detector 16 registers a phase difference between the two antennas which is either positive (lead) or negative (lag), which provides a way of separately coding two symbols.

It is possible to define relative to the sampling point $z'_o$ (as defined in the given example) a phase lead/lag along the longitudinal axis (the z axis as defined in this example) and simultaneously a phase lead/lag on a transverse axis (y axis) by providing an axial slot ($F_0$ or $F'_0$ in the given example) before or after the sampling point $z'_o$ (on the z axis) and to the left or to the right of a reference point $y'_o$ on the y axis.

The symbol is therefore associated with four different phase states. The slot can therefore occupy four positions: before/left, before/right, after/left, after/right and this makes it possible to double the capacity of the beacon because a symbol can be used to code any one of the two-bit numbers 00, 01, 10 or 11.

The phase lead/lag on the aforementioned two axes is measured by different equipment. The receive members are therefore four antennas fastened together:

one pair of antennas disposed along the longitudinal axis (exactly as in the previous example), an associated electronic device measuring the phase-shift between the signals received by these two antennas, one pair of antennas disposed along the transverse axis, associated with a similar device, enabling the phase lead/lag between the two antennas to be measured.

There is claimed:

1. Microwave system for locating a mobile element comprising a hollow tube forming a waveguide having an axis, means for feeding said waveguide with microwave signals, a location beacon radiating into free space an electromagnetic wave derived from the microwave signals propagating in the waveguide and a location antenna attached to said mobile element and adapted to receive the electromagnetic wave radiated by said beacon, in which system said location beacon is adapted to transmit to said antenna a single electric field signal enabling transmission of a location message, wherein said location message is embodied in said beacon which comprises a number of radiating slots in said waveguide arranged to form a symbol or a succession of symbols recognizable individually by measuring the value of the phase of said electric field signal received by said location antenna as said mobile element passes over said beacon.

2. System according to claim 1 wherein a symbol is in the form of an axial slot at a negative coordinate on an axis parallel to the waveguide axis relative to a reference point $z'_o$ representing a time of sampling said electric field signal.

3. System according to claim 2 wherein said axial slot is disposed at a positive or negative coordinate relative to a reference point $Y'_o$ on an axis transverse to the waveguide.

4. System according to claim 3 wherein a symbol is in the form of an axial slot at a positive coordinate on an axis parallel to the waveguide axis relative to a reference point $z'_o$ representing a time of sampling said electric field signal and said location antenna comprises two antennas disposed symmetrically relative to an axis orthogonal to the axis of the guide so that said orthogonal axis is substantially over said reference point $z'_o$ relative to said sampling times on passing over said symbol and a detector of the sign of the phase difference between the signals received by said antennas and said location antenna further comprises two antennas disposed symmetrically relative to an axis parallel to the axis of the waveguide so that said axis is substantially vertically above said reference point $y'_o$ on passing over said symbol and a detector of the sign of the phase difference between the signals received by said two antennas.

5. System according to claim 2 wherein a symbol is in the form of an axial slot at a positive coordinate on an axis parallel to the waveguide axis relative to a reference point $z'_o$ representing a time of sampling said electric field signal and said location antenna comprises two antennas disposed symmetrically relative to an axis orthogonal to the axis of the waveguide so that said orthogonal axis is substantially over said reference point $z'_o$ relative to said sampling times on passing over said symbol and a detector of the sign of the phase difference between the signals received by said antennas.

6. System according to claim 1 wherein a symbol is in the form of an axial slot at a positive coordinate on an axis parallel to the guide axis relative to a reference point $z'_o$ representing a time of sampling said electric field signal.

7. System according to claim 6 wherein said axial slot is further disposed at a positive or negative coordinate relative to a reference point $Y'_o$ on an axis transverse to the waveguide.

8. Microwave system for locating a mobile element comprising a hollow tube forming a waveguide having an axis, means for feeding said waveguide with microwave signals, a location beacon radiating into free space an electromagnetic wave derived from the microwave signals propagating in the waveguide and a location antenna attached to said mobile element and adapted to receive the electromagnetic wave radiated by said beacon, in which system said location beacon is adapted to transmit to said antenna a single electric field signal enabling transmission of a location message, wherein said location message is embodied in said beacon which comprises a number of radiating slots in said waveguide arranged to form a symbol or a succession of symbols recognizable individually by measuring the value of the amplitude of said electric field signal received by said location antenna as said mobile element passes over said beacon, and wherein a symbol is in the form of two sets each of one or more axial slots on the same side of the waveguide axis, said sets being disposed symmetrically to the waveguide axis.

9. System according to claim 8 wherein said location antenna comprises two antennas disposed symmetrically relative to the waveguide axis adapted to be substantially vertically over said sets on passing over said symbol, means for introducing a 180° phase-shift between the signals received by said antennas and means for summing the phase-shifted signals.

10. Microwave system for locating a mobile element comprising a hollow tube forming a waveguide having an axis, means for feeding said waveguide with microwave signals, a location beacon radiating into free space an electromagnetic wave derived from the microwave signals propagating in the waveguide and a location antenna attached to said mobile element and adapted to receive the electromagnetic wave radiated by said beacon, in which system said location beacon is adapted to transmit to said antenna a single electric field signal enabling transmission of a location message, wherein said location message is embodied in said beacon which comprises a number of radiating slots in said waveguide arranged to form a symbol or a succession of symbols recognizable individually by measuring the value of the amplitude of said electric field signal received by said location antenna as said mobile element passes over said beacon, and wherein a symbol is formed by two groups each formed by one or two sets of one axial slot or a plurality of axial slots disposed on the same side of the waveguide axis, said sets are disposed symmetrically relative to the waveguide axis and said groups are disposed symmetrically relative to an axis orthogonal to the waveguide axis and spaced by an integer multiple of $\lambda g/2$ where $\lambda g$ is the wavelength within the waveguide.

11. System according to claim 10 wherein a symbol is in the form of an axial slot at a positive coordinate on an axis parallel to the waveguide axis relative to a reference point $z'_o$ representing a time of sampling said electric field signal and said location antenna comprises two antennas disposed symmetrically relative to an axis orthogonal to the axis of the waveguide so that said orthogonal axis is substantially over said reference point $z'_o$ relative to said sampling times on passing over said symbol and a detector of the sign of the phase difference between the signals received by said antennas and said location antenna further comprises two antennas disposed symmetrically relative to an axis parallel to the axis of the waveguide so that said axis is substantially vertically above said reference point $Y'_o$ on passing over said symbol and a detector of the sign of the phase difference between the signals received by said two antennas.

12. Microwave system for locating a mobile element comprising a hollow tube forming a waveguide having an axis, means for feeding said waveguide with microwave signals, a location beacon radiating into free space an electromagnetic wave derived from the microwave signals propagating in the waveguide and a location antenna attached to said mobile element and adapted to receive the electromagnetic wave radiated by said beacon, in which system said location beacon is adapted to transmit to said antenna a single electric field signal enabling transmission of a location message, wherein said location message is embodied in said beacon which comprises a number of radiating slots in said waveguide arranged to form a symbol or a succession of symbols recognizable individually by measuring the value of the amplitude of said electric field signal received by said location antenna as said mobile element passes over said beacon, and wherein a symbol is in the form of two groups each in the form of one or two sets each of one axial slot or a plurality of axial slots disposed on the same side of the waveguide axis, said sets are disposed symmetrically relative to the waveguide axis and said groups are disposed symmetrically relative to an axis orthogonal to the waveguide axis and spaced by an integer multiple of $\lambda g$ where $\lambda g$ is the waveguide wavelength.

* * * * *